United States Patent
Lee et al.

(10) Patent No.: US 7,876,130 B2
(45) Date of Patent: Jan. 25, 2011

(54) DATA TRANSMITTING DEVICE AND DATA RECEIVING DEVICE

(75) Inventors: Kyoo-Joon Lee, Gwanak-gu (KR);
Dae-Joong Jang, Anyang-si (KR);
Woo-Jae Choi, Dongjak-gu (KR)

(73) Assignee: Dongbu HiTek Co., Ltd., Seoul (KR)

( * ) Notice: Subject to any disclaimer, the term of this patent is extended or adjusted under 35 U.S.C. 154(b) by 0 days.

(21) Appl. No.: 12/647,509

(22) Filed: Dec. 27, 2009

(65) Prior Publication Data
US 2010/0166129 A1    Jul. 1, 2010

(30) Foreign Application Priority Data
Dec. 30, 2008    (KR)    ...................... 10-2008-0136907

(51) Int. Cl.
*H03K 19/00*    (2006.01)
(52) U.S. Cl. .......................................... 326/82; 326/93
(58) Field of Classification Search .................... 326/82, 326/83, 93, 52–55, 59, 105
See application file for complete search history.

(56) References Cited

U.S. PATENT DOCUMENTS

| | | | |
|---|---|---|---|
| 6,526,109 B1 * | 2/2003 | Chang et al. | 375/371 |
| 6,542,274 B1 * | 4/2003 | Demarest et al. | 398/154 |
| 2010/0225620 A1 * | 9/2010 | Lee | 345/204 |

* cited by examiner

*Primary Examiner*—Don P Le
(74) *Attorney, Agent, or Firm*—Sherr & Vaughn, PLLC

(57) ABSTRACT

A data transmitting device and a data receiving device are disclosed. The data transmitting device may include a clock signal generator for generating a clock signal, and a transmitter for generating a transmission signal having the clock signal inserted in a data signal, wherein the clock signal has only a single differential element, and the data signal has two differential elements with an amplitude identical to an amplitude of the clock signal. The clock signal may be embedded and the clock signal may be restored by using the common element of the data signal without any auxiliary reference voltage. As a result, only the data signal line may be used between the data transmitting device and the data receiving device, to reduce the number of transmitting lines. Furthermore, the data transmitting and receiving devices according to embodiments will not need a reference voltage. As a result, the clock signal may be restored smoothly even if the size of the data signal is changing. Further, the amplitude of the clock signal included in the data signal is identical with the amplitude of the data signal. As a result, additional power consumption and EMI may be reduced.

23 Claims, 6 Drawing Sheets

DATA TRANSMITTING DEVICE AND DATA RECEIVING DEVICE

The present application claims priority under 35 U.S.C. 119 to Korean Patent Application No. 10-2008-0136907 (filed on Dec. 30, 2008), which is hereby incorporated by reference in its entirety.

BACKGROUND

RSDS (Reduced Swing Differential Signaling) or mini-LVDS (Low Voltage Differential Signaling) may be used in an interface between a timing controller and a source driver for a display panel. However, these two methods require quite a lot of lines, with differing high frequency operations.

Figure 1:
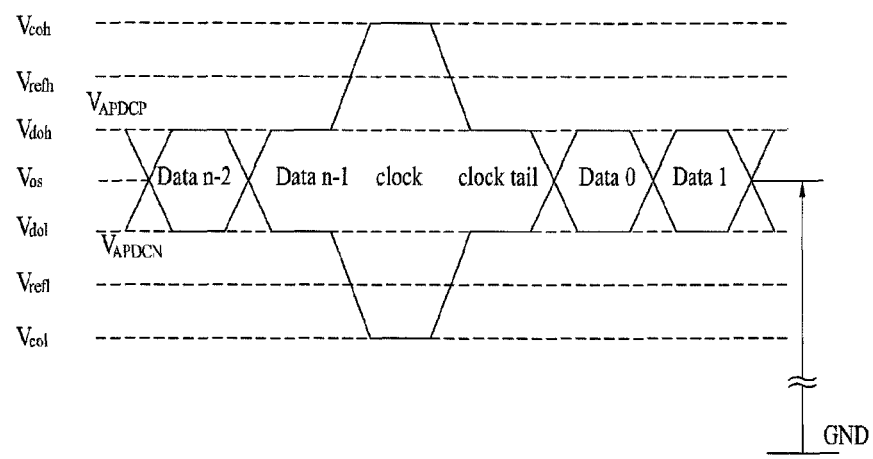

FIG. 1 is a waveform of a related transmitting signal. To solve above disadvantages, as shown in FIG. 1, a clock signal (CLK) may be embedded in a multi-level signal to reduce signal lines, and AiPi (Advanced Intra Panel Interface) enabling high frequency operation, may be used. However, such AiPi has the following disadvantages with respect to signal restoration.

First of all, the usage of the multi-level signal may increase electricity consumption in comparison to usage of a single level signal, thereby also increasing EMI (Electromagnetic interference). Secondly, an additional reference signal (Vrefh, Vrefl) line is necessary to restore the clock signal. Thirdly, if a level of the reference signal changes, that is, there is change in a data signal or out of the clock signal, the clock signal would be restored incorrectly or not corrected at all. The reference signal is changed easily by changes of a process or a power, voltage, or temperature. Fourthly, a difference between the clock signal and the data signal results in a difference in the transition time. This difference will make both of the clock and data signals restored from the receiver terminal fail to synchronize. As a result, a problem might occur in a timing margin for latching the data signal.

SUMMARY

Embodiments relate to a data interface, more particularly, to a data transmitting device and a data receiving device. Embodiments relate to a data transmitting device that is able to transmit both of clock and data signals with identical amplitudes.

Embodiments relate to a data receiving device that is able to restore the clock signal from a signal transmitted from the data transmitting device, without a reference signal. Embodiments relate to a data transmitting device which may include a clock signal generator for generating a clock signal, and a transmitter for generating a transmission signal having the clock signal inserted in a data signal, wherein the clock signal has only a single differential element, and the data signal has two differential elements with an amplitude identical to an amplitude of the clock signal.

Embodiments relate to a data transmitting device includes a clock signal generator for generating a clock signal; and a transmitter a transmission signal the clock signal and a data signal having identical sizes and shapes with two differential elements, respectively, inserted therein prior to a strobe signal having a single differential element.

Embodiments relate to a data receiving device includes a common extractor for receiving a transmission signal having a data signal and a clock signal, the clock signal having a single differential element inserted therein, the data signal having two differential elements with an amplitude identical to the clock signal, and the common extractor for extracting a common element of the differential elements included in the data signal from the received transmission signal; and a clock/data restorer for restoring the clock signal and the data signal from the received transmission signal by using the common element.

Embodiments relate to a data receiving device which may include a common element extractor for receiving a transmission signal having a clock signal and a data signal, the clock and data signals having identical sizes and shapes with two differential elements, respectively, inserted therein prior to a strobe signal having a single differential element, the common element extractor configured to extract a common element of the differential elements of the data signal; and a clock/data restorer for restoring the strobe signal and the data signal from the received transmission signal by using the common element, and for restoring the clock signal by using the restored strobe signal.

DRAWINGS

FIG. 1 is a waveform of a related transmitted signal.

Figure 2:
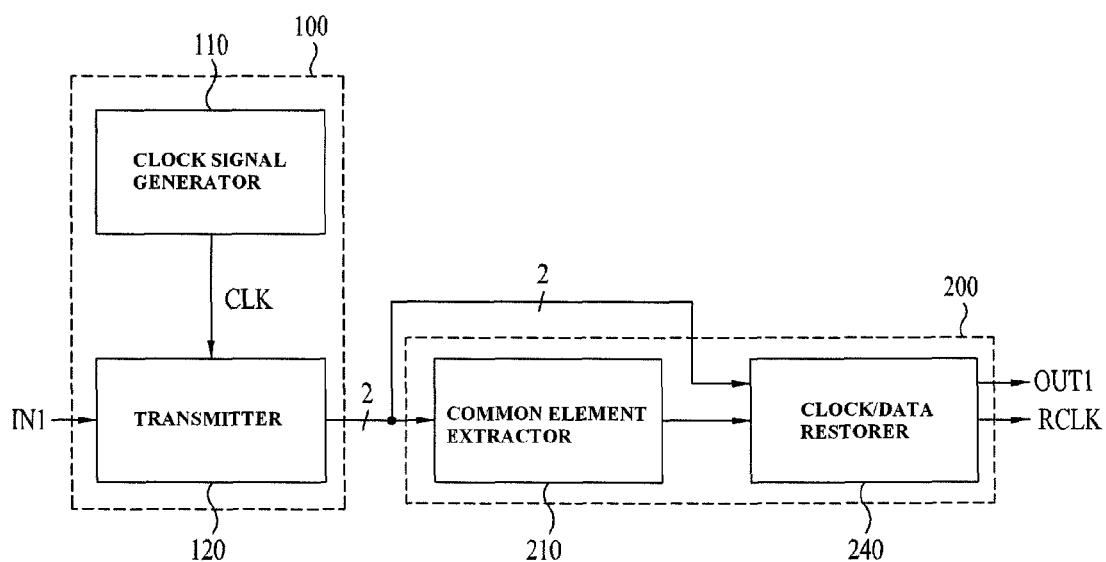

Example FIG. 2 is a block view schematically illustrating a data transmitting/receiving device according to embodiments.

Example FIGS. 3A to 3D are waveforms of a transmission signal transmitted to a data receiving device from the data transmitting device according to embodiments.

Figure 4A:
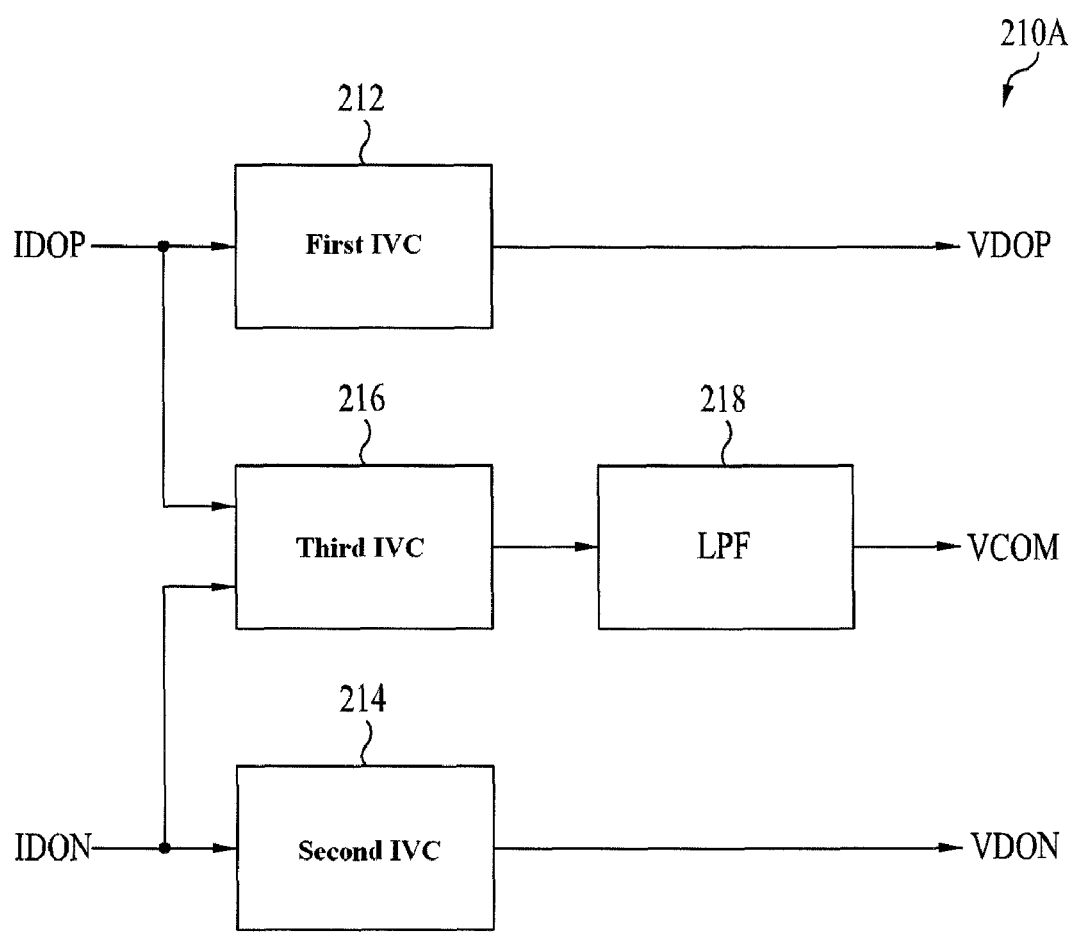
Figure 4B:
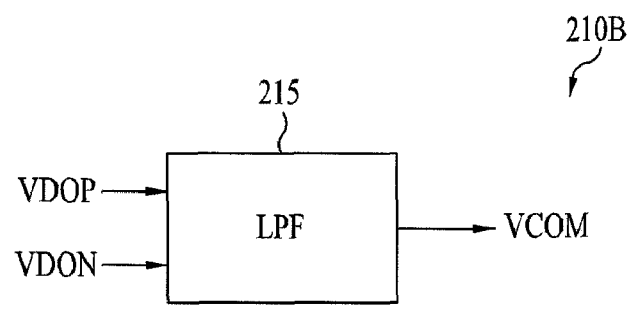

Example FIGS. 4A to 4B are block views illustrating embodiments of a common element extractor shown in example FIG. 2.

Figure 5:
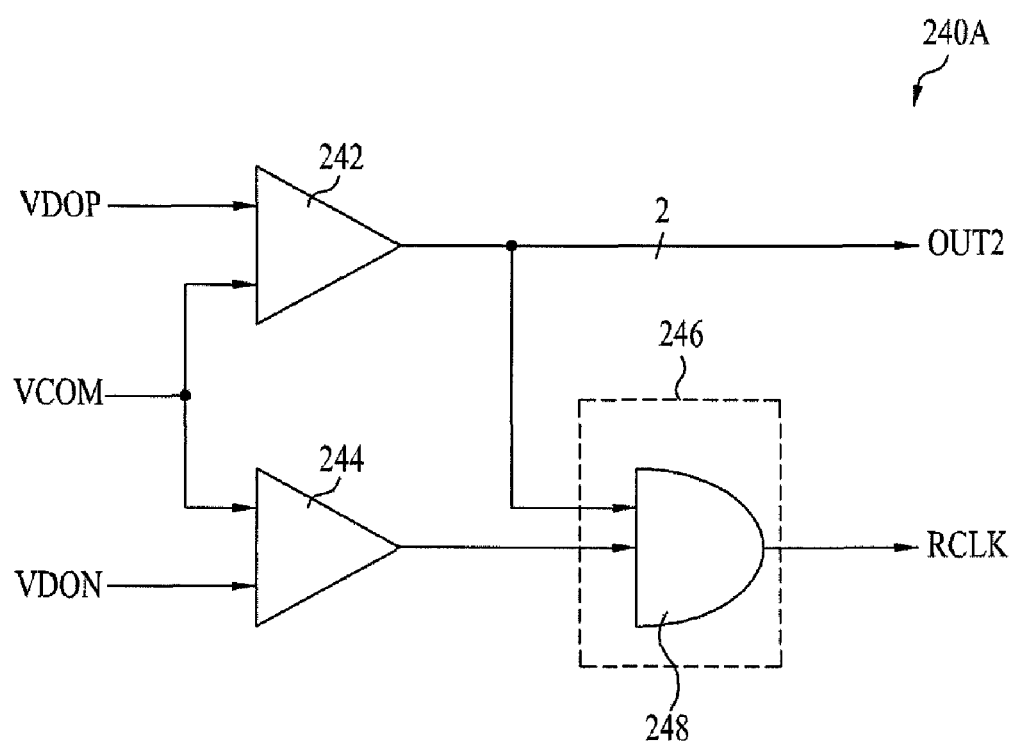

Example FIG. 5 is a block view illustrating embodiments of a clock/data restituting part shown in example FIG. 2.

Figure 6:
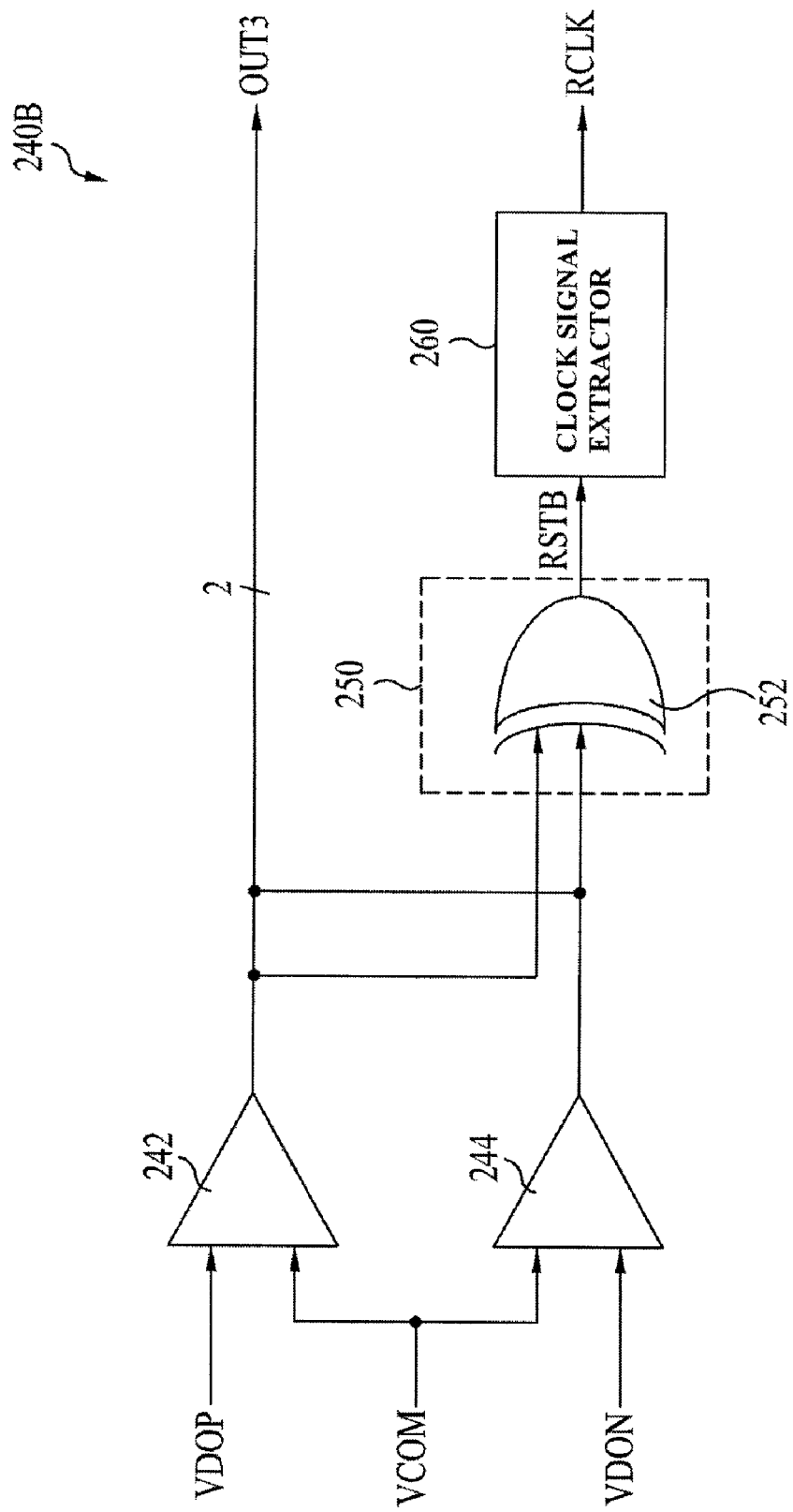

Example FIG. 6 is a block view also illustrating embodiments of the clock/data restituting part shown in example FIG. 2.

Figure 7:
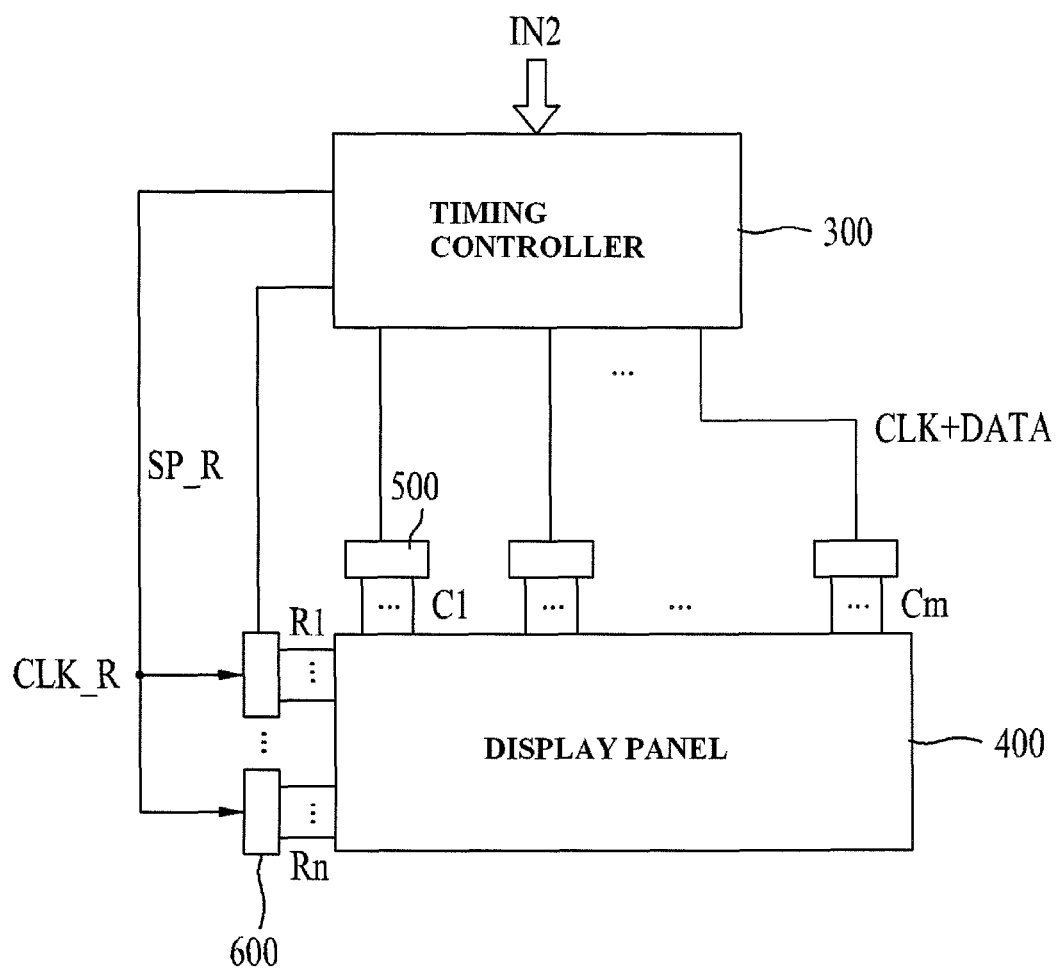

Example FIG. 7 is a diagram illustrating a structure of a display having embodiments applied thereto.

DESCRIPTION

A data transmitting/receiving device according to an embodiments will be described below with reference to the accompanying drawings. Example FIG. 2 is a block view schematically illustrating a data transmitting device 100 and a data receiving device 200 according to embodiments.

The data transmitting device 100 shown in example FIG. 2 may include a clock signal generator 110 and a transmitting part 120. The clock signal generator 110 generates a clock signal and it outputs the generated clock signal (CLK) to the transmitting part 120. The transmitting part 120 generates a transmission signal in various ways which will described layer, by using the clock signal output from the clock signal generator 110 and data input via an input terminal (INI). The transmission signal generated in the transmitting part 120 may be a current or voltage type.

Prior to describing these configurations, related characteristics of a differential signal will be described. Such a differential signal has a pair of differential elements. A high element of the two is defined as 'positive level' and the other low element is defined as 'negative level'. Moreover, in differential signal transmission, the positive level is transmitted via one of two lines as channel and the negative level is transmitted via the other line. If the data to be transmitted is a high level, a line for transmitting a positive level may be referenced to as 'P-channel' and the other line for transmitting a negative level may be referenced to as 'N-channel'. In contrast, if the data to be transmitted is a low level, a line for transmitting a positive level is referenced to as 'N-channel' and the other line for transmitting a negative level is referenced to as 'P-channel'.

Example FIGS. 3A to 3D are exemplary waveforms of a transmission signal transmitted from the data transmitting device 100 to the data receiving device 200. According to embodiments, the transmitting part 120 may generate a transmission signal having the clock signal (CLK) inserted in a data signal (Pixel Data/configuration). The generated signal is transmitted to the data receiving device 200 via a channel. In this case, the clock signal (CLK) may only have a P-channel voltage (VDOP) of a differential element as shown in example FIG. 3A or a N-channel voltage (VDON) of a differential element as shown in example FIG. 3B. That is, a phase of the clock signal (CLK) included in the transmission signal is identical. In contrast, the data signal has the two differential elements of the P-channel and N-channel, although it has the amplitude identical to the clock signal (CLK). That is, the data signal has a reverse phase.

The transmission signals may be generated with the data signal and the clock signal (CLK) differentiated with respect to the reverse and identical phases as mentioned above. The related transmission signal shown in FIG. 1 is a multi-level signal, and the amplitude of the clock signal is higher than that of the data signal. However, in case of the transmitted data being generated by the data transmitting device 100, the amplitude of the clock signal (CLK) is identical to that of the data signal.

Here, the data signal may include at least one of image data (Pixel Data) and control data (configuration). Unlike the configuration shown in example FIGS. 3A and 3B, the clock signal (CLK) may be inserted between random data signals or inserted between predetermined bundles of the data signals.

According to embodiments, the transmitting part 120 may include in the transmission signal at least one of a prior dummy (Dum) 10 arranged prior to the clock signal (CLK) and a posterior dummy (Dum) 12 posterior to the clock signal (CLK). For example, as shown in example FIGS. 3A and 3B, the transmitting part 120 may generate the transmission signal with the prior dummy 10 and posterior dummy 12 arranged before and after the clock signal (CLK).

According to embodiments, the transmitting part 120 may generate the transmission signal having the clock signal (CLK) and the data signal inserted therein after a strobe signal (STB: STroBe). In this case, the clock signal (CLK) and the data signal have P-channel and N-channel voltages (VDOP and VDON) of the two differential elements, respectively, with identical sizes and appearances. That is, the clock signal and the data signal have reverse phases. In contrast, the strobe signal (STB) has the single differential element (VDOP or VDON). That is, the strobe signal (STB) is an identical phase.

According to a further embodiment, the clock signal (CLK) may be inserted posterior to the strobe signal (STB). Alternatively, the clock signal (CLK) may be inserted in a position spaced a predetermined distance from the strobe signal (STB). Information relating to the relative position from the strobe signal (STB) the clock signal (CLK) may be inserted in and may be shared commonly by the data transmitting and receiving devices 100 and 200 in advance.

According to a still further embodiment, the transmitting part 120 may make the transmission signal include at least one of a prior dummy (Dum) 14 arranged prior to the strobe signal (STB) and a posterior dummy (Dum) 16 arranged posterior to the strobe signal (STB). For example, as shown in example FIGS. 3C and 3D, the transmitting part 120 may generate the transmission signal including the prior dummy 14 and the posterior dummy 16 arranged prior and posterior to the strobe signal (STB), respectively. If the posterior dummy 16 is included in the transmission signal, the clock signal (CLK) may be inserted right after the posterior dummy 16, as shown in example FIGS. 3A and 3B.

The reason why the prior dummy 10 or 14 or the posterior dummy 12 or 16 is arranged prior or posterior to the clock signal (CLK) or the strobe signal (STB) is that the clock signal (CLK) or the strobe signal (STB) may be damaged when the transmission signal is transmitted at a high rate. If the transfer rate of the transmission signal is not high, the transmitting part 120 may not include the prior dummy 10 or 14 or the posterior dummy 12 or 16 in the transmission signal.

The data receiving device according to embodiments will be described below with reference to the accompanying drawings. The data receiving device 200 may include a common element extractor 210 and a clock/data restorer 240 as shown in example FIG. 2.

Figure 3A:
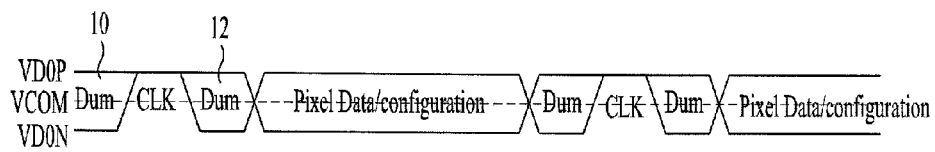
Figure 3B:
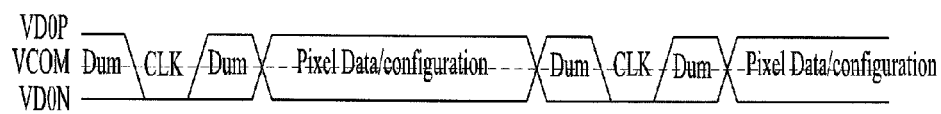
Figure 3C:
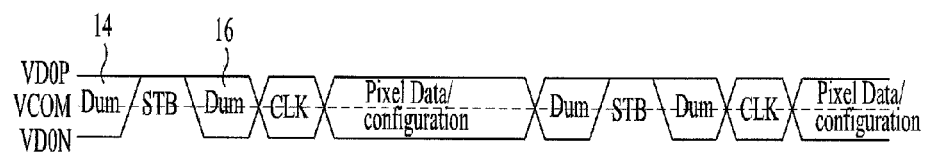
Figure 3D:
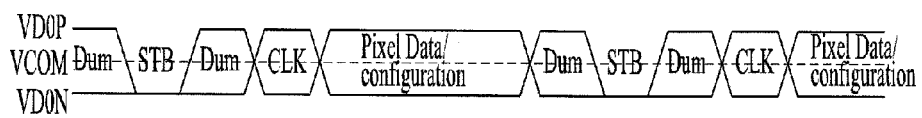

In embodiments, the transmission signal, as shown in example FIG. 3A or 3B, may have a clock signal (CLK) constituted as a single differential element (VDOP or VDON) inserted in the data signal, which has the two differential elements (VDOP and VDON) with identical amplitude to the clock signal (CLK). The operation of the data receiving device 200 receiving these signals will be described below.

The common element extractor 210 extracts a common element of the differential elements of the data signal from the received signal. Example FIGS. 4A to 4B are block views illustrating embodiments (210A and 210B) of the common element extractor 210, respectively.

First of all, if the received transmission signal is a current type, the common element may be extracted from the received signal using a circuit shown in example FIG. 4A. In reference to example FIG. 4A, a common element extractor 210A includes first, second, third current/voltage converters 212, 214 and 216 and a low pass filter (LPF) 218.

The first current/voltage converter 212 converts a current type differential element (IDOP) of the data signal into voltage type differential elements (VDOP). The second current/voltage converter 214 converts the other (IDON) of the differential elements (IDOP and IDON) of the data signal into a voltage type differential element (VDON). The third current/voltage converter 216 converts the current type differential elements (IDOP and IDON) of the data signal into voltage types and it outputs the converted differential elements to the LPF 218. Here, the first, second and third current/voltage converters 212, 214 and 216 may be represented as passive, positive or amplifier. The LPF 218 low-pass-filters the outputs of the first current/voltage converter 216, and it outputs the result of the low pass filtering as a common element (VCOM).

Hence, if the received transmission signal is a voltage type, the common element may be extracted from the received signal by using a circuit shown in example FIG. 4B. In reference to example FIG. 4B, a common element extractor 210B may include a LPF 215. The LPF 215 low-pass-filters voltage type differential elements (VDOP and VDON) of the data signal and it outputs the result of the low-pass-filtering as common element (VCOM).

If the received signal is a data signal, the common element (VCOM) having a middle level between the P-channel voltage (VDOP) and the N-channel voltage (VDON) via circuits shown in example FIGS. 4A and 4B. If the received signal is not the data signal but the clock signal (CLK) or the strobe signal (STB), the common element (VCOM) having the middle level of the P-channel and the N-channel voltages (VDOP and VDON) may not be generated via the circuits shown in example FIGS. 4A and 4B. To prevent this, each pass-frequency (ft) of the LPFs 218 and 215 has to be smaller than a transmission frequency (fc) for transmitting the transmission signal. As a result, if the transmission signal received currently is clock signal (CLK) or the strobe signal (STB), not the data signal, the common element extracted from the data signal received before may be used by the clock/data restorer (240).

In the meanwhile, the clock/data restorer 240 restores the clock signal (RCLK) and data signal from the transmission signal received currently. The restored data signal is outputted via an output terminal (OUT1).

Example FIG. 5 is a block view illustrating an embodiment 240A of the clock/data restorer shown in example FIG. 2 and the clock/data restorer 240A includes first and second comparers 242 and 244 and a logical combination part 246.

The first comparer 242 compares one of the voltage type differential elements (VDOP and VDON) of the data signal with the common element (VCOM). The second comparer 244 compares the other one of the voltage type differential elements of the data signal with the common element (VCOM). The result of the comparison performed by the above comparers 242 and 244 is bypassed via an output terminal (OUT2) as a restored data signal.

The logical combination part 246 performs logical combination for the outputs of the first and second comparers 242 and 244, and it outputs the result of the logical combination as the restored clock signal (RCLK). For example, the logical combination part 246 may be represented as a logical multiplication part 248 or a logical exclusive part.

The logical multiplication part 246 performs a logical operation on the outputs of the first and second comparers and it outputs the result of the logical multiplication as the restored clock signal (RCLK). The logical exclusive part performs exclusive OR operation on the output of the first and second comparators 242 and 244 and it outputs the result of the exclusive OR operation as the restored clock signal (RCLK).

To make the clock/data restorer 240 shown in example FIG. 5 understood, input conditions of the first and second comparators 242 and 244 will be described as follows. Assuming that the type of the transmission signal is as shown in example FIG. 3a, the common element (VCOM) may be transmitted to negative, or inverting, (−) input terminals of the first and second comparators 242 and 244 and the differential voltage (VDON) is transmitted to a positive, non-inverting (+) input terminal of the second comparator 244. In this case, the logical combination part 246 uses an AND gate 248.

An operation of the data receiving device 200 will be described below. In embodiments a transmission signal having the clock signal (CLK) and data signal may have reverse phases, with same sizes and appearance. The transmission signal may be inserted after the strobe signal (STB), having an identical phase, for example, as shown in example FIG. 3C or 3D, when it is received from the data transmitting device 100.

According to embodiments, an operation of extracting a common element may be identical to the operation of the above first embodiment and the detailed description thereof will be omitted accordingly. To extract the common element, a circuit may be used to extract the common element as shown in example FIGS. 4A and 4B.

However, an operation of a clock/data restorer 240 may vary among embodiments. Here, the clock/data restorer 240 restores a strobe signal (STB) and a data signal from the received signal by using the common element and it restores a clock signal (RCLK) by using the restore strobe signal (RSTRB).

Example FIG. 6 is a block view illustrating embodiments (240B) of the clock/data restorer 240 shown in example FIG. 2. The clock/data restorer 240B may include first and second comparators 242 and 244, a logical combination part 250 and a clock signal extractor 260.

Different from the clock/data restorer 240A shown in example FIG. 5, the clock/data restorer 240B shown in example FIG. 6 further includes a clock signal extractor 260. While the restored clock signal (RCLK) is outputted from the logical combination part 246 shown in example FIG. 5, the restored strobe signal (RSTB) is outputted from the logical combination part 250 shown in example FIG. 6. Except this, the clock/data restorers 240A and 240B shown in example FIGS. 5 and 6 perform the identical operation and only the different operation will be described as follows.

The clock signal extractor 260 restores (RCLK) the clock signal (CLK) from the received transmission signal by using the restored strobe signal (RSTB). That is, as mentioned above, the data transmitting device 100 and the data receiving device 200 know in advance which position from the strobe signal (STB) the clock signal (CLK) is arranged. As a result, the clock signal may be restored from the restored strobe signal (RSTB).

By using a related process, the data signal may be restored from the small-sized transmission signal received in a differential signal type. That is, the received differential signal may be compared by using the comparator to be restored as digital signal easily.

The above data transmitting device 100 and the data receiving device 200 shown in example FIG. 2 may be applicable to various cases. If the data transmitting and receiving devices 100 and 200 are applied to a display, the configuration and operation of the data transmitting device 100 and the data receiving device 200 according to embodiments will be described below with reference to the corresponding drawings, and embodiments are not limited thereto.

Example FIG. 7 is a diagram illustrating a structure of a display having embodiments applied thereto. In reference to example FIG. 7, the display may include a timing controller 300, a display panel 400, a source driver or column drivers 500 and a gate driver or low drivers 600. Here, the source driver 500 and the gate driver 600 may be integrated circuits. The timing controller 300 controls the source drivers 500. The source drivers 500 and the gate drivers 600 may be employed to drive the display panel 400. The display panel 400 displays images based on injected signals (R1 to Rn) and data signals (C1 to Cm). The display panel 400 may be one of various display panels useable between the timing controller 300 and a display driving integrated circuit (DDI), for example, a TFT liquid crystal display (TFT-LCD), LCD panel, plasma display panel (PDP) or organic luminescence electro display (OLED) panel and FED.

The gate drivers 600 may apply the injected signals (R1 to Rn) to the display panel 400. The source drivers 500 may apply the data signal (C1 to Cm) to the display panel 400. The timing controller 300 may receive a low voltage differential signaling (LVDS) data and an external clock signal (LVDS CLK') via an input terminal (IN2) and convert the input image data into differential signals such as transistor-transistor logic (TTL) signals or transition minimized differential signals (TMDS). Also, the timing controller 300 transmits the transmission signal configured of the data signal (DATA), strobe signal (STB) and clock signal (CLK) to the source drivers 500 and it applies the clock signal (CLK_R) and a start pulse (SP_R) to the gate drivers 600. The data signal (DATA) transmitted to the source driver 500 from the timing controller

300 may include only screen or image data to be displayed in the display panel 400 or further include a control signal.

The timing controller 300 corresponds to the data transmitting device 100 according to embodiments shown in example FIG. 2. That is, the timing controller 300 may generate the transmission signal having the clock signal and the data signal having the identical sizes and shapes and reverse phases, respectively, inserted therein after the strobe signal having the identical phase or the transmission signal having the clock signal (CLK) having the identical phase inserted in the data signal having the identical amplitude to the clock signal and the reverse phase. Also, the timing controller 300 transmits the generated transmission signal to the source driver 500. As mentioned above, the transmission signal may be a differential signal. In this case, only a single differential pair may be used to transmit the strobe signal (STB), clock signal (CLK) and data signal (DATA) to one of the source drivers 500 from the timing controller 300.

In the meanwhile, the source driver 500 may correspond to the data receiving device 200 according to embodiments shown in example FIG. 2. That is, the source driver 500 receives the transmission signal transmitted by the timing controller 300 and it extracts the clock signal (CLK) or the strobe signal (STB) from the received transmission signal by using the common element. Then, the source driver 500 restores the clock signal (CLK) from the extracted strobe signal (STB) and it samples the data signal (DATA) of the transmission signal by using the restored clock signal (RCLK) by using the common element.

The data transmitting and receiving devices according to embodiments may have following advantages. The clock signal may be embedded and the clock signal may be restored by using the common element of the data signal without any auxiliary reference voltage. As a result, only the data signal line may be used between the data transmitting device and the data receiving device, reducing the number of transmitting lines.

Furthermore, the data transmitting and receiving devices according to embodiments may not require a reference voltage. As a result, the clock signal may be restored smoothly even if the size of the data signal is changing. Still further, the amplitude of the clock signal included in the data signal is identical to each other. As a result, additional power consumption and EMI may be reduced.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
a clock signal generator for generating a clock signal; and
a transmitter for generating a transmission signal having the clock signal inserted in a data signal, wherein the clock signal has only a single differential element, and the data signal has two differential elements with an amplitude identical to an amplitude of the clock signal.

2. The apparatus of claim 1, wherein the clock signal is inserted between random ones of the data signals.

3. The apparatus of claim 1, wherein the clock signal is inserted in predetermined bundles of the data signals.

4. The apparatus of claim 1, wherein the transmission signal includes at least one of a prior dummy arranged prior to the clock signal and a posterior dummy arranged posterior to the clock signal.

5. An apparatus comprising:
a common extractor for receiving a transmission signal having a data signal and a clock signal, the clock signal having a single differential element inserted therein, the data signal having two differential elements with an amplitude identical to the clock signal, and the common extractor for extracting a common element of the differential elements included in the data signal from the received transmission signal; and
a clock/data restorer for restoring the clock signal and the data signal from the received transmission signal by using the common element.

6. The apparatus of claim 5, wherein the common element extractor includes a low-pass filter for low-pass filtering the differential elements of the data signal and for outputting the result of the low pass filtering as the common element.

7. The apparatus of claim 6, wherein the common element extractor includes:
a first current/voltage converter for converting one of the differential elements of the data signal into a voltage type differential element;
a second current/voltage converter for converting the other one of the differential elements of the data signal into a voltage type differential element;
a third current/voltage converter for converting the differential elements of the data signal into voltage type differential elements,
wherein the low pass filter low-pass-filters the output of the third current/voltage converter and the low pass filter outputs the result of the low pass filtering as the common element.

8. The apparatus of claim 7, wherein the clock/data restorer includes a first comparator for comparing the common element with one of the voltage type differential element of the data signal; and
a second comparator for comparing the common element with the other one of the voltage type differential elements of the data signal.

9. The apparatus of claim 8, wherein the clock/data restorer includes a logical combination part to logically combine the outputs of the first and second comparators and for outputting the result of the logical combination as the restored clock signal, wherein the outputs of the first and second comparators are used as the restored data signal.

10. The apparatus of claim 9, wherein the logical combination part includes a logical multiplication part for performing a logical operation on the outputs of the first and second comparators and for outputting the result of the logical operation as the restored clock signal.

11. The apparatus of claim 9, wherein the logical combination part includes a logical exclusive part for performing a logical exclusive operation on the outputs of the first and second comparators and for outputting the result of the logical exclusive operation as the restored clock signal.

12. An apparatus comprising:
a clock signal generator for generating a clock signal; and
a transmitter for generating a transmission signal including the clock signal, a data signal and a strobe signal, the clock and data signals having identical sizes and shapes with two differential elements, the clock and data signals inserted into the transmission signal prior to a strobe signal, the strobe signal having a single differential element.

13. The apparatus of claim 12, wherein the clock signal is inserted right after the strobe signal.

14. The apparatus of claim 12, wherein the clock signal is inserted in a predetermined position preset with respect to the strobe signal.

15. The apparatus of claim 12, wherein the transmitter is configured to insert into the transmission signal at least one of a prior dummy arranged prior to the strobe signal and a posterior dummy arranged posterior to the strobe signal.

16. An apparatus comprising:
a common element extractor for receiving a transmission signal having a clock signal and a data signal, the clock and data signals having identical sizes and shapes with two differential elements, respectively, inserted therein prior to a strobe signal having a single differential element, the common element extractor configured to extract a common element of the differential elements of the data signal; and
a clock/data restorer for restoring the strobe signal and the data signal from the received transmission signal by using the common element, and for restoring the clock signal by using the restored strobe signal.

17. The apparatus of claim 16, wherein the common element extractor includes a low-pass filter for low-pass-filtering the differential elements of the data signal and for outputting the result of the low-pass-filtering as the common element.

18. The apparatus of claim 17, wherein the common element extractor includes:
a first current/voltage converter for converting a first differential element of the data signal into a first voltage type differential element;
a second current/voltage converter for converting a second differential element of the data signal into a second voltage type differential element;
a third current/voltage converter for converting the first and second differential elements of the data signal into voltage type differential elements,
wherein the low pass filter low-pass-filters the output of the third current/voltage converter and the low pass filter outputs the result of the low pass filtering as the common element.

19. The apparatus of claim 18, wherein the clock/data restorer includes:
a first comparator for comparing the common element with the first voltage type differential element of the data signal; and
a second comparator for comparing the common element with the second voltage type differential element of the data signal.

20. The apparatus of claim 19, wherein the clock/data restorer further includes a logical combination part for logically combining the outputs of the first and second comparators and for outputting the result of the logical combination as the restored clock signal, wherein the outputs of the first and second comparators are bypassed as the restored data signal.

21. The apparatus of claim 20, wherein the logical combination part includes a logical multiplication part for performing a logical process on the outputs of the first and second comparators, and for outputting the result of the logical process as the restored clock signal.

22. The apparatus of claim 20, wherein the logical combination part includes a logical exclusive part for performing a logical exclusive operation of the outputs of the first and second comparators and for outputting the result of the logical exclusive operation as the restored clock signal.

23. The apparatus of claim 20, wherein the clock/data restorer includes a clock signal extractor for restoring the clock signal from the received transmission signal by using the restored strobe signal.

* * * * *